United States Patent
Taylor

(10) Patent No.: US 7,099,665 B2
(45) Date of Patent: Aug. 29, 2006

(54) APPARATUS AND METHOD FOR PROVIDING SATELLITE LINK STATUS NOTIFICATION

(75) Inventor: Scott P Taylor, Renton, WA (US)

(73) Assignee: The Boeing Company, Chicago, IL (US)

( * ) Notice: Subject to any disclaimer, the term of this patent is extended or adjusted under 35 U.S.C. 154(b) by 671 days.

(21) Appl. No.: 10/352,306

(22) Filed: Jan. 27, 2003

(65) Prior Publication Data

US 2004/0147259 A1    Jul. 29, 2004

(51) Int. Cl.
*H04B 17/00*    (2006.01)
*H04Q 7/20*    (2006.01)

(52) U.S. Cl. .................. 455/430; 455/67.7; 455/431

(58) Field of Classification Search ............. 455/67.11, 455/67.15, 67.16, 67.7, 427–428, 430–431
See application file for complete search history.

(56) References Cited

U.S. PATENT DOCUMENTS

| | | | |
|---|---|---|---|
| 5,557,656 A | 9/1996 | Ray et al. | |
| 5,956,644 A | 9/1999 | Miller et al. | |
| 6,018,659 A | 1/2000 | Ayyagari et al. | |
| 6,061,562 A | 5/2000 | Martin et al. | |
| 6,108,523 A | 8/2000 | Wright et al. | |
| 6,163,681 A | 12/2000 | Wright et al. | |
| 6,167,239 A | 12/2000 | Wright et al. | |
| 6,173,159 B1 | 1/2001 | Wright et al. | |
| 6,192,240 B1 | 2/2001 | Tayloe et al. | |
| 6,201,797 B1 | 3/2001 | Leuca et al. | |
| 6,253,067 B1 | 6/2001 | Tsuji | |
| 6,285,878 B1 | 9/2001 | Lai | |
| 6,392,692 B1 | 5/2002 | Monroe | |
| 6,449,287 B1 | 9/2002 | Leuca et al. | |
| 6,590,875 B1 | 7/2003 | Niwa | |
| 2001/0041539 A1 | 11/2001 | Juntunen et al. | |
| 2002/0087992 A1* | 7/2002 | Bengeult et al. | 725/76 |
| 2002/0160733 A1 | 10/2002 | Gresham et al. | |
| 2002/0168971 A1 | 11/2002 | Parkman | |
| 2002/0170060 A1* | 11/2002 | Lyman | 725/73 |

FOREIGN PATENT DOCUMENTS

| | | |
|---|---|---|
| EP | 0 890 907 A1 | 1/1999 |
| EP | 1 209 928 A2 | 5/2002 |

(Continued)

OTHER PUBLICATIONS

European Search Report dated Jun. 4, 2004.
Copy of European Search Report dated Jun. 4, 2004.

*Primary Examiner*—Binh K. Tieu
(74) *Attorney, Agent, or Firm*—Harness Dickey & Pierce P.L.C.

(57) ABSTRACT

A system and method for informing users of a possible disruption in a communications link established between users traveling on a mobile platform and a fixed base station. In one preferred form, the invention enables a user on a mobile platform to log on to access a web server on the mobile platform and to obtain information on the availability/status of the communications link formed between the mobile platform and the fixed base station. In another preferred embodiment, the user is provided by the web server with a pop-up window which automatically appears on the user's computing device that is periodically updated with useful information concerning the performance of the network on board the mobile platform and/or the status of the communications link linking the mobile platform and a fixed base station, and the possibility of an imminent disruption in the satellite communications link.

13 Claims, 1 Drawing Sheet

FOREIGN PATENT DOCUMENTS

| | | |
|---|---|---|
| JP | 2000-196678 | 7/2000 |
| WO | WO 96/03846 | 2/1996 |
| WO | WO 00/14987 | 3/2000 |
| WO | WO 02/103931 | 12/2002 |

\* cited by examiner

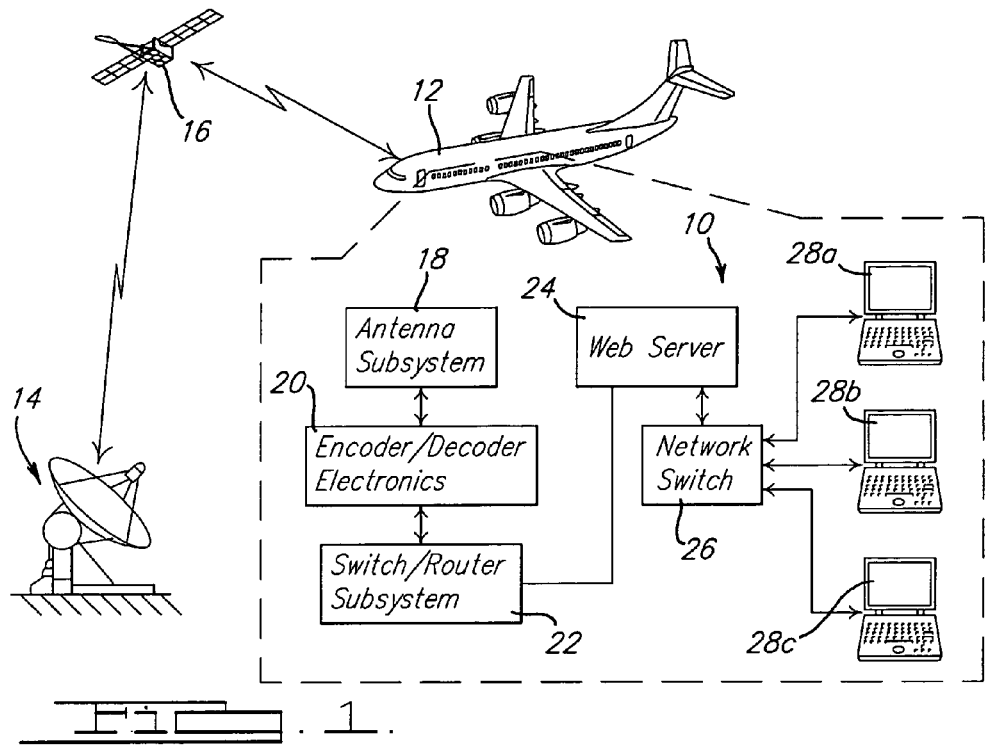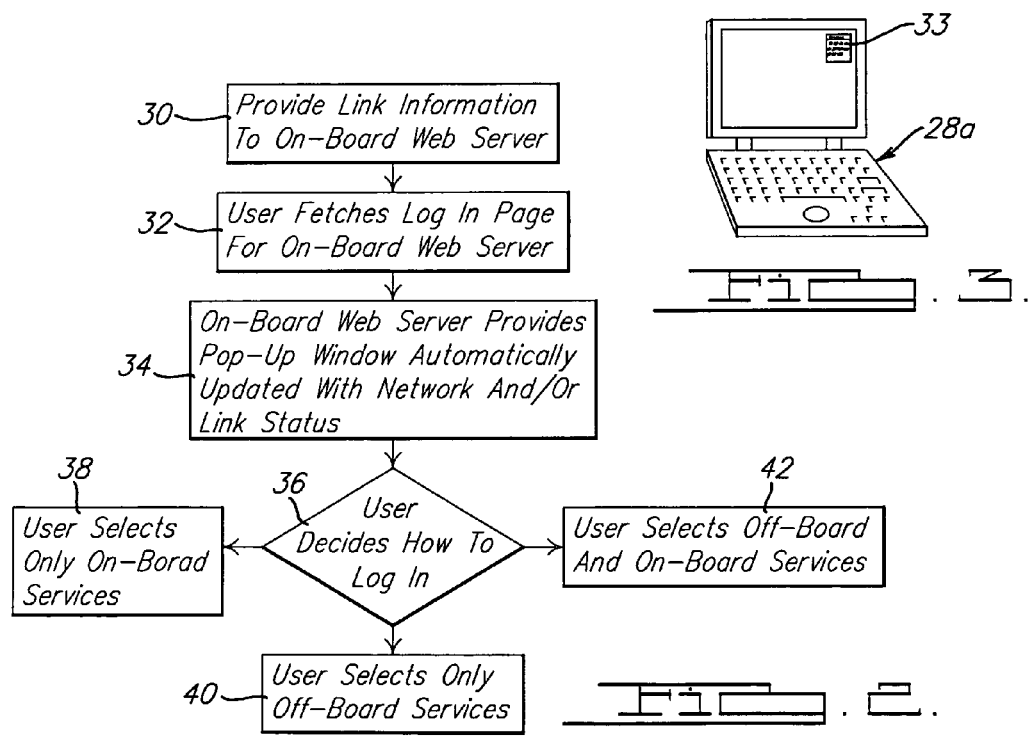

APPARATUS AND METHOD FOR PROVIDING SATELLITE LINK STATUS NOTIFICATION

FIELD OF THE INVENTION

The present invention relates to systems for providing communication links between a ground-based communications center and the electronic devices of one or more users on board a mobile platform such as an aircraft, and more particularly a system and method for notifying the users when the mobile platform is about to leave a designated coverage region which could, or would, affect the communications link provided to each user.

BACKGROUND OF THE INVENTION

There is a growing interest in the ability to provide high speed communications links between a ground-based communications station and a mobile platform, such as an aircraft, via one or more satellite-based transponders. With such systems, the satellite-based transponder relays data and other information between users on board the mobile platform and the ground-based communications station. One such exemplary system is shown in U.S. patent application Ser. No. 09/989,742, filed Nov. 20, 2001, assigned to the assignee of the present application, the disclosure of which is hereby incorporated by reference. Such a system enables a satellite transponder, or a series of satellite-based transponders, to provide continuous radio frequency (RF) connectivity between the ground-based station and the computing devices being used on the mobile platform by the users while the mobile platform travels within a predefined coverage region. However, with certain forms of mobile platforms, and particularly with commercial aircraft, which can travel significant distances within a very short period of time, there are expected to be instances where the communications link being provided by the satellite-based transponder (or transponders) will be lost temporarily due to the changing location of the aircraft. Also, it is possible that other factors may arise that could affect the communications link formed with the mobile platform. Accordingly, it would be highly desirable to provide some system of advance notification to the users on board the mobile platform that the satellite-based communications link which the user is using is about to be lost or temporarily interrupted. This would enable the user to conclude email sessions, chat sessions, or other activities without the risk of losing important information if the satellite link were to be suddenly interrupted without any advance notification.

SUMMARY OF THE INVENTION

The present invention is directed to a method and apparatus for providing advance notification of a disruption in a satellite-based communications link which is linking a terrestrial base station with the computing devices of one or more users on board a mobile platform. In a preferred form the method involves having a user on the mobile platform connect his/her computing device to a network on the mobile platform, for example, a local area network (LAN). The user then accesses a page, such as a home page, on a server located on board the mobile platform. The server provides a pop-up window to the user's computing device with various network information and information concerning the satellite communications link that is linking the mobile platform with the terrestrial base station. This pop-up window is periodically updated with information concerning the performance/capacity of the on-board network and the satellite communications link. Importantly, if an interruption in the satellite communications link is anticipated, a warning can be provided by the terrestrial base station to the mobile platform, which in turn can relay the warning via a message from the server to the user's computing device of the imminent link interruption. The user can also log-in to a network associated with the server to access on-board services provided by the server or to access a different server associated with the terrestrial base station.

In the preferred method described above, well known "push" technology can be used to periodically update the server on-board the mobile platform with important status information concerning the performance of the network or the satellite communications link ("network/link information") that the user would find helpful while accessing the server. The user can also choose to "hide" the pop-up window, delete it, or maintain it on the screen of his/her computing device.

In an alternative arrangement, the user can simply access a web page on the server where network/link information is provided at his/her leisure while working from his/her computing device. However, this arrangement would obviously not be as efficient at providing immediate notice to the user if an interruption in the satellite communications link was about to occur.

In any of the above embodiments, the user is either provided with advance notification, or an opportunity to obtain advance notification, of a disruption of the satellite communications link serving the mobile platform he/she is traveling on. In certain preferred embodiments, this warning can be provided essentially in real time to the user. Thus, the user is afforded an opportunity to conclude work with which the satellite communications link is being used, and therefore avoid the loss of any data that might occur during a temporary or permanent drop out of the link.

Further areas of applicability of the present invention will become apparent from the detailed description provided hereinafter. It should be understood that the detailed description and specific examples are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a simplified block diagram of a system in accordance with a preferred embodiment of the present invention being used to provide a satellite communications link to communicate with a ground-based station;

FIG. 2 is a flow chart of the steps of operation of the method of the present invention in providing information to the user as to the status/availability of the satellite communications link and the network on board the mobile platform; and FIG. 3 is a simplified view of a pop-up window provided on the screen of one of the computing devices to provide network/link information to the user.

DETAILED DESCRIPTION OF THE PREFERRED EMBODIMENTS

The following description of the preferred embodiment(s) is merely exemplary in nature and is in no way intended to limit the invention, its application, or uses.

Referring to FIG. 1, there is shown a system 10 in accordance with a preferred embodiment of the present invention. The system 10 is implemented on a mobile platform 12 such as an aircraft, train, bus, ship, or other vehicle that travels within a predefined coverage region. The system 10 is in communication with a ground-based data content provider system 14 via a satellite-based transponder 16. The satellite-based transponder 16 enables a high-speed satellite communications link to be established between the ground-based station 14 and the mobile platform 12 to allow a connection to an Internet service provider to be established, or to enable other important forms of information to be transmitted, essentially in real time, to the mobile platform 12, as the mobile platform travels within the designated coverage region.

On board the mobile platform 12, the system 10 can be viewed as including an antenna subsystem 18 for receiving and transmitting information, if radio frequency (RF) formed, between the system 10 and the ground-based station 14. The antenna subsystem 18 communicates with an encoder/decoder electronic subsystem 20, which is in turn in communication with a switch/router subsystem 22. The switch/router subsystem 22 is in communication with a web server 24. The web server 24 is in communication with a network switch 26 which is in turn in communication with computing devices 28a–28c of individual users on board the mobile platform 12. While only three such computing devices 28a–28c are shown, it will be appreciated that a greater or lesser plurality could easily be incorporated. The computing devices 28a–28c could further be hard-wired to the network switch 26 or could be coupled via a wireless access point to provide wireless connectivity of the computing devices 28a–28c to the network switch 26.

The switch/router subsystem 22 serves to monitor the traffic between the network switch 26 and the computing devices 28a–28c. The switch/router subsystem 22 and the network switch 26 essentially form a local area network. In effect, the switch/router subsystem 22 effectively monitors the traffic of the local area network (LAN) formed between the network switch 26 and the computing devices 28a–28c. The antenna subsystem 18 can be used to supply information, via the switch-router subsystem 22, to the web server 24 related to a specific coverage region and information such as location of the mobile platform at a given time within the coverage region. Other information could comprise satellite communication link information, such as the loading of the satellite communications link, that could affect the RF throughput of the link. The switch/router subsystem 22 provides still further information to the users of the computing devices 28a–28c such as throughput/capacity, network latency, network congestion, and network jitter, or other information concerning the ground-based station 14 and/or the on board local area network that could affect the performance that the user experiences when accessing the web server 24.

It will be appreciated that as the mobile platform 12 travels about within a predetermined coverage region, that various factors could cause momentary disruption in the satellite communications link formed between the ground-based station 14 and the antenna subsystem 18. Such interruption could occur if the mobile platform 12 approaches the outer bounds of the coverage region. In such an instance, the system 10 operates to allow the users of the computing devices 28a–28c to be notified of an imminent disruption in the satellite communications link or of other events that could affect use being made of the satellite communications link.

Referring to FIG. 2, a preferred method of the present invention involves using the system 10 to receive such warning information from the ground-based station 14 and to provide this information via "push" technology to the on board web server 24, as indicated at step 30. The user then fetches the log-in page for the on board web server 24, as indicated at step 32.

Referring to FIGS. 2 and 3, the on board web server link then provides a pop-up window 33 (FIG. 3) automatically to the user's computing device 28a–28c with status information concerning the performance of the network and/or the satellite communications link, as shown at step 34. This information could comprise information relating to the network traffic being experienced by the system 10 at a given time or information pertaining to the performance of the satellite communications link linking the system 10 with the ground station 14. At step 36, the user decides to log-in for either on-board services (i.e., those services provided strictly from the web server 24), as indicated at step 38, for off-board services (i.e., those services available via the ground-based system 14), as indicated in step 40, or for both on-board and off-board services as indicated at step 42. Once the user is logged on to the web server 24, the pop-up window that is displayed on the user's computing device can be either minimized by the user (i.e., hidden) or deleted by the user. The content provided by the pop-up window from the web server 24 is continuously updated by either the switch/router subsystem 22 and/or the ground-based system 14 to thus provide continuous updates to the user as to the performance/capacity of the network to which the user is connected and/or the satellite communications link that the user is availing himself/herself of.

It will also be appreciated that in the event the user wishes to begin an off-board session wherein the user will be accessing one or more servers located at the ground-based station 14, the user could be required to provide registration and/or log-in information directly to the ground-based system via the satellite communications link. In this manner, the specific data content could be directed back to the user via the satellite communications link and the switch/router subsystem 22.

It will also be appreciated that various arrangements could be employed, such as instant messaging and/or chat sessions with the users, to provide the information on link/network performance. Obviously, these would involve having the user supply his/her email address or other identifying information to the web server 24. The user could optionally be required to supply some form of registration information to the web server 24 before automatic updates on link/network information are sent to the user.

The present invention thus provides a means to quickly provide important information to a user to alert the user of imminent RF signal fade, network congestion on board the mobile platform, any regional service outages, as well as overall satellite communications link status and/or overall network status. Importantly, the information can be provided in real time, or substantially real time, to notify a user that the mobile platform the user is traveling on is about to leave a predefined satellite coverage region which will result in the loss of communication with the ground-based station 14. This allows the user to terminate any work (i.e., email session, chat session, etc.) wherein the satellite communications link is being used and thus helps prevent the loss of important information if the satellite communications link were to be lost without warning to the user.

It will also be appreciated that while the present invention is particularly well adapted for use with aircraft that are able to travel significant distances within a relatively short period of time, that the invention could just as readily be implemented on any other form of mobile platform that is communicating with a fixed base station. Thus, the present invention could be readily implemented to notify users traveling on ships, busses, trains, and other vehicles that a loss of a communications link with a fixed base station is about to occur.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for notifying a user of a status of a communications link that the user is making use of while the user is traveling on a mobile platform and using a computing device to effect the communications link, and wherein the communications link is formed between the user's computing device and a ground based computing component via a satellite based transponder, the method comprising:
   a) having said user use said computing device to connect with a communication network located on board said mobile platform;
   b) using said communication network on board said mobile platform to effect said communications link with said ground based component;
   c) having said user access an electronic information supplying component located on-board said mobile platform, said component containing information concerning said communications link; and
   d) using said ground based component to provide advanced notification to said user via said communications link, said electronic information supplying component, and said user's computing device, substantially in real time, that said communications link may be at least temporarily interrupted.

2. The method of claim 1, wherein step c) comprises having said user supply said user's email address to said ground based component.

3. The method of claim 1, wherein:
   step c) comprises having said user access a web server located on said mobile platform.

4. The method of claim 1, wherein information concerning said communications link is pushed onto said electronic information supplying component from said ground based component.

5. The method of claim 1, wherein step d) comprises posting messages on a web server operably associated with said ground based component that advise said user of an imminent disruption with said communications link due to a changing location of said mobile platform.

6. A method for notifying a user of a status of a communications link that the user is making use of while the user is traveling on a mobile platform and using a computing device to effect the communications link, and wherein the communications link is formed between the user's computing device and a ground based system via a satellite based transponder, the method comprising:
   a) having said user use said computing device to connect with a server located on board said mobile platform;
   b) forming said communications link between said ground based system and said server;
   c) having said user log on to said server; and
   d) using said server to supply a pop-up window to a display screen of said user's computing device;
   e) using said server to relay, through said pop-up window, information concerning said communications link to said user.

7. The method of claim 6, wherein information concerning said communications link is pushed onto web server periodically from said base station.

8. The method of claim 6, wherein said user accesses a home page stored on said server and logs on to an information supplying component associated with said ground based station.

9. The method of claim 6, wherein said user supplies information to said server to effect an instant messaging session with said server.

10. The method of claim 6, wherein said user supplies information to said server to effect a chat session.

11. A method for notifying a user of an imminent disruption of a satellite communications link that the user is making use of while the user is traveling on a mobile platform and using a computing device making use of the satellite communications link, wherein the communications link is formed between the user's computing device and a ground based computing component via a satellite based transponder, the method comprising:
   a) having said user access a home page associated with a server on board said mobile platform, via a local area network formed on board said mobile platform;
   b) providing said user with a pop-up screen on a display of said user's computing device containing information concerning the performance of said satellite communications link;
   c) using said ground based computing component to periodically update said server with new information concerning the performance of said satellite communications link and information concerning a possible interruption in said satellite communications link; and
   d) using said server to provide a message to said user via said pop-up window on said user's computing device when a disruption in said communications link may occur, in advance of said disruption.

12. The method of claim 11, wherein information from said ground based computing component is pushed onto said server on board said mobile platform.

13. The method of claim 11, wherein said user is able to delete said pop-up window from said display of said computing device.

* * * * *